S. W. FINCH.
LIQUID LEVEL INDICATOR.
APPLICATION FILED DEC. 31, 1921.
1,423,411. Patented July 18, 1922.
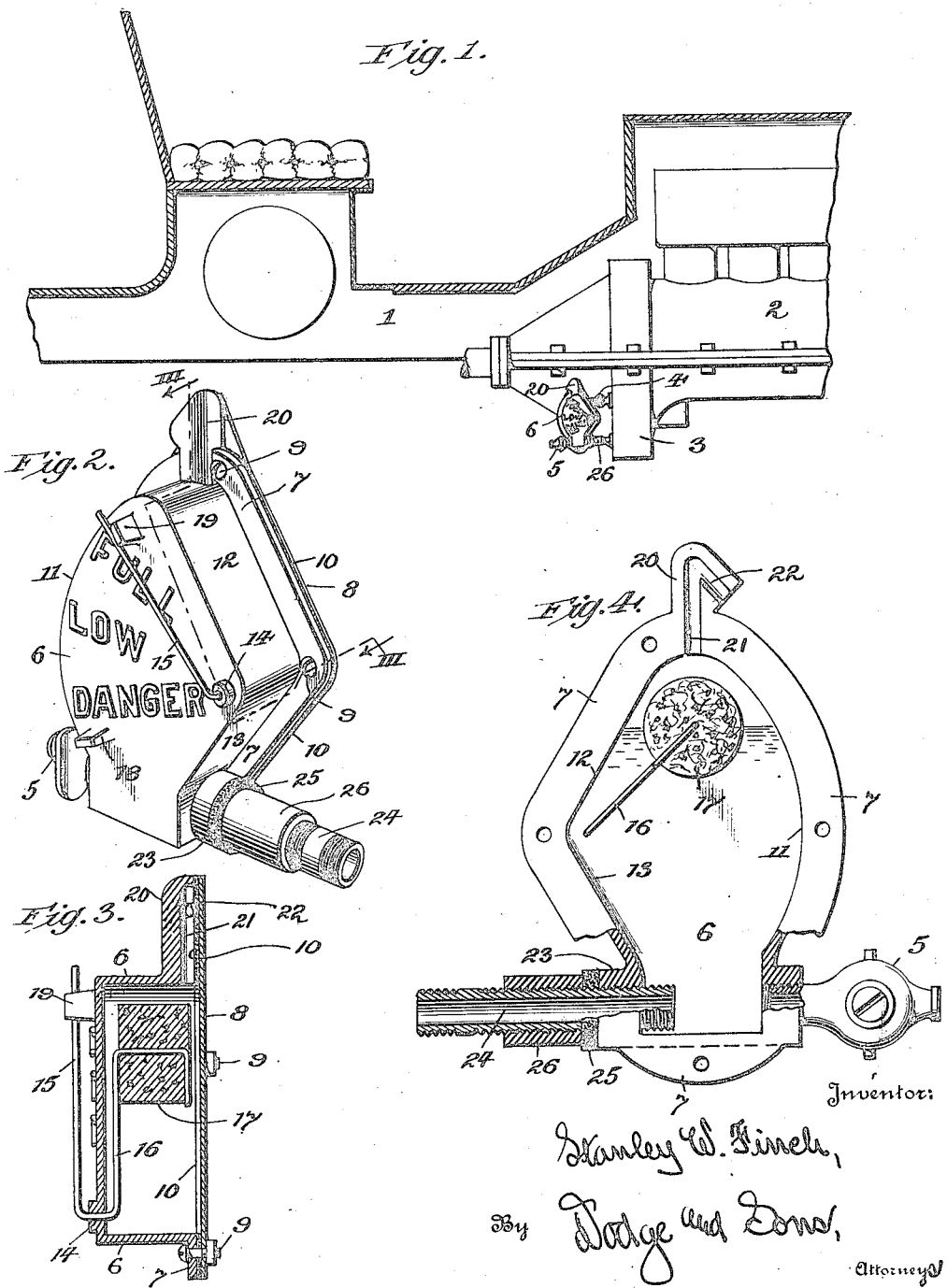

UNITED STATES PATENT OFFICE.

STANLEY W. FINCH, OF WASHINGTON, DISTRICT OF COLUMBIA.

LIQUID-LEVEL INDICATOR.

1,423,411.　　　　Specification of Letters Patent.　　Patented July 18, 1922.

Application filed December 31, 1921. Serial No. 526,241.

*To all whom it may concern:*

Be it known that I, STANLEY W. FINCH, a citizen of the United States, residing at Washington, District of Columbia, have invented certain new and useful Improvements in Liquid-Level Indicators, of which the following is a specification.

This invention pertains to liquid level indicators, and relates more particularly to means for indicating the level of the oil in the reservoir of splash systems employed in conjunction with internal combustion engines. The specific application of the invention hereinafter described is shown in connection with a Ford car and does away with the many inconveniences and inaccuracies which are inherently present in the manner of determining the oil level in the machine.

The Ford car as placed upon the market is provided with two pet-cocks arranged at different levels in the rear of the magneto and fly wheel housing, and as will be readily appreciated by those who drive a Ford car, said pet-cocks are somewhat inaccessible, being under the machine, and at best afford but an inaccurate means of testing the oil level in the housing which forms the reservoir for the lubricating oil. It is necessary in the testing of the oil through the medium of the pet-cocks to turn one or both of the pet-cocks in order that the operator may be sure that oil is present and also whether or not it is at a proper height or level in the reservoir. Frequently a careless operator will put too much oil in and failing to open the upper pet-cock to insure a proper test, will flood the engine.

The present invention has for its object the provision of means for visually indicating the oil level in the housing, which means may be readily attached to the car and connected with the opening from which the lower pet-cock is removed. Such pet-cock is, however, attached to the indicator so that it may be utilized, as it now is, for draining out the reservoir when occasion so requires.

The construction is illustrated in the accompanying drawings, wherein,—

Fig. 1 is a sectional elevation of so much of an automobile, of the Ford type, with my indicator applied thereto, as is necessary to an understanding of the invention;

Fig. 2 a perspective view of the indicator;

Fig. 3 a cross sectional view taken on the line III—III of Fig. 2, looking in the direction of the arrow; and Fig. 4 a sectional elevation of the main body of the structure with the back or cover plate removed.

In the drawings, 1 denotes the body of the vehicle, 2 the engine housing, and 3 the well or reservoir into which the fly wheel and magneto extend, and which is partially filled with oil, and from which it is splashed and conveyed to lubricate the engine parts, as is well understood. The upper pet-cock, which may be left in situ, is indicated by 4. The lower pet-cock 5, normally present upon a Ford machine, is removed and screwed into the lower portion of a shell or casing, preferably of the form illustrated in the drawing. Said shell or casing may be said to comprise a hollow body member denoted generally by 6, which at its inner or rear edge is provided with a laterally projecting flange 7. A cover plate 8 is secured to the flange by suitable fastening means, as bolts 9, a gasket 10 being interposed between the flange and said cover plate so as to effect a tight joint between the parts and thus porduce a chamber.

In order to make the device as small as possible and yet allow for sufficient room for the float to act, I preferably form the body, as shown, that is to say, I provide an arcuate side 11 and two converging sides 12 and 13, the outer face being preferably provided with a boss or enlargement 14 adjacent the line of juncture between the faces or sides 12 and 13. An opening is drilled through the boss and a combined float arm and indicator is mounted in said opening. This member is produced from a piece of wire bent into substantially U form, the outer or indicating arm of which is denoted by 15, and the inner arm by 16, said inner arm having attached thereto a float 17, formed of any suitable material. The outer or indicating arm 15 lies parallel to the outer face of the casing, and stops 18 and 19 extend outwardly from the casing and coact with the indicator arm 15 to limit its upward and downward movement, said stops being so positioned as to prevent the float coming in contact with the walls of the casing and possibly adhering or sticking thereto, which, of course, would render the device objectionable. The outer face preferably has cast thereon, or otherwise produced, the words "Full," "Low," and "Danger," so that one by merely glancing at the structure, may see exactly what the oil level in the well or reservoir 3 may be.

It is necessary, of course, that the chamber be vented, in order that the oil may readily enter the same, and to this end in the casting of the main body I provide an upwardly extending element 20 having a groove or depression formed in its rear face, comprising two interconnected sections 21 and 22, the former being vertically disposed, and the latter being inclined downwardly and opening outwardly at its lower end. The gasket 10 is so formed as to overlie the rear face of the extension 20, said face, in effect, forming an extension of the flange 7, so as not in any wise to distort the gasket 10 and permit the cover plate 8 to firmly force the gasket to position. As will be noted upon reference to Fig. 2 the cover plate may be extended laterally to a slight extent beyond the gasket at this point in order to give the cover plate sufficient rigidity. There is thus formed a duct or passage extending from the upper end of the chamber, which duct or passage is provided with a downwardly extending mouth or opening. Thus the dirt is prevented from entering the opening while at the same time permitting the exit of the air from the chamber when the oil is being poured into the engine housing. It also serves the further function of permitting the oil to escape if one carelessly puts too much oil into the engine housing. Moreover, by this upward and lateral extension of the duct or passage, oil is prevented from running out when the car is going up hill.

In order that the structure may be readily positioned, and at the same time held in place, the lower portion of the body is preferably formed with a boss 23, which is internally threaded and is adapted to receive a threaded pipe or nipple 24. A washer 25 is placed about the pipe and said washer is designed to be put under compression by a nut 26 mounted upon the pipe. The outer externally threaded end of the pipe 24 is designed to be screwed into the opening from which the lower pet-cock of the machine has been removed. In placing the indicator in position one will screw the pipe 24 inwardly, say to the position shown in Fig. 4, and then turn the opposite end into the opening in the reservoir 3 from which the lower pet-cock has been removed. This will, of course, back the pipe 24 out of the threaded boss 23 to the extent to which the pipe is screwed into the reservoir 3, after which the nut 26 will be advanced, compressing the washer and locking the pipe firmly to the indicator.

As will be seen upon reference to Fig. 1, the indicator stands adjacent the rearward extension of the engine housing and consequently any tendency for the pipe 24 to turn out of the opening in the reservoir 3 will be prevented as the indicator will contact the rear extension of the housing. Any tendency to swing outwardly and downwardly would merely tend to screw the pipe 24 more tightly into the threaded opening in the reservoir. It will thus be seen that the device may be readily applied and that once positioned it will retain its place. Moreover, it may be readily viewed so that the operator of the machine may at all times know the exact condition or level of the oil within the reservoir.

What is claimed is,—

1. In combination with an oil reservoir of an internal combustion engine; a vented chamber in communication with the lower portion thereof; a wire bent to substantially U-form, the short member which connects the arms thereof being journaled in the casing at one side thereof; a float in the chamber carried by the inner arm of said U-shaped member; and stops located upon the face of the casing adapted to coact with the other arm to limit the movement of the U-shaped member and to thereby prevent the float from contacting the walls of the chamber.

2. In combination with an oil reservoir of an internal combustion engine; a chamber connected to the lower portion thereof and into which oil may flow from the reservoir; a float located in the chamber; and an arm operatively connected with said float, said arm overlying the exposed face of the chamber said chamber being provided at its upper portion with an upward extension having a vent formed therein, said vent having a downwardly opening mouth open to the atmosphere, substantially as and for the purpose described.

3. In combination with an oil reservoir of an internal combustion engine; a chamber in communication with the reservoir, said chamber being formed with an open side; a flange extending laterally from the chamber adjacent said open side, said flange being provided with an upward extension having a groove or channel formed therein with the channel extending upwardly and then downwardly and outwardly in an inclined direction; a gasket overlying the flange and said extension and the channel formed therein; a cover plate secured to the flange, said plate contacting the gasket and forming a tight joint therewith, said gasket and cover plate closing the side of the channel except for the downwardly open mouth; a float located in the chamber; and an indicator arm connected to the float and overlying an exposed face of the chamber.

In testimony whereof I have signed my name to this specification.

STANLEY W. FINCH.